UNITED STATES PATENT OFFICE.

BYRON B. GOLDSMITH, OF NEW YORK, N. Y.

GELATOID THERMOPLASTIC COMPOUND.

No. 925,328.   Specification of Letters Patent.   Patented June 15, 1909.

Application filed October 7, 1907. Serial No. 396,190.

*To all whom it may concern:*

Be it known that I, BYRON B. GOLDSMITH, a citizen of the United States, residing in the borough of Manhattan, city, county, and State of New York, have invented a certain new and useful Improvement in Gelatoid Thermoplastic Compounds, of which the following is a specification.

This invention has relation to an improved thermoplastic compound formed from the gelatoids, (for instance glue collogen, chondrigen, isinglass etc.) with their derivatives and compounds.

In my U. S. Patent Number 840,931, dated January 8th, 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while reasonably hard at ordinary temperatures, are rendered soft by heat, so as to permit the uniting of separate masses, and the molding of any mass to any desired shape. My present invention is based upon the discovery that the results obtained by the method described in said patent as applied to casein can also be reached by a similar treatment of the gelatoids and their derivatives and compounds. The principal gelatoids available for commercial purposes are collogen or ossein from bones, skin etc., chondrigen derived from permanent cartilages, and isinglass, from fish bladders. The term "gelatoid" is to be understood herein as covering, not only the albuminoids commonly classified under that head, but also gelatin which is derived from them by treatment with hot water. This term also covers the derivatives and compounds of the gelatoids.

Shortly stated, my invention involves the modification of the properties of these proteid bodies by uniting them with converting agents under conditions of heat and pressure, for the production of a thermoplastic composition of matter, useful in the manufacture of molded articles of many kinds, and supplying a cheap and superior substitute for celluloid, rubber etc.

The term "converting agent" as used in my present specification and claims covers any substance which, when combined or admixed with a gelatoid, its derivative or compound, acts when heated, to soften the same, but whose softening action is suspended or materially diminished upon lowering the temperature of the mass. Among the converting agents which I have found useful are alphanaphthol, beta-naphthol, benzoic acid, carbolic acid, hydrochinon, cresol, pyrocatechin, resorcin, salicylic acid, urea, benzoic acid, phthalic acid, phloroglucin, pyrogallol, paratoluidin, naphthylamin, benzidin, oxy-naphthoic acid, anilin, toluidin and xylidin. It is to be understood however that I do not limit myself to these, but that my invention covers the use of equivalents of these substances and has the scope heretofore explained. The mode of action of these converting agents is not altogether clear. In some cases it is probably due to partial solution of the gelatoid when heated, but I do not confine myself to any theory of action; nor is it essential to my invention whether or not there is a chemical combination between the gelatoid and the converting agent.

One characteristic of a "converting agent" is its capacity to remain in the mass and not be volatilized to a material extent when moderate heat is applied. I have discovered that the best results are obtained by the use of solid reagents, such as alpha or beta naphthol and I have claimed this variant of my process and product specifically herein. Where flexibility is desired in the product, however, I have discovered that a liquid converting agent or liquids not antagonistic to the mixture may be combined with a solid agent to great advantage.

The properties of the thermoplastic compound in the cold state will vary with the particular converting agent employed and with the proportions used. Thus a great variety of characteristics are obtainable by suitable variations in proportions and qualities.

In the manufacture of my present composition the gelatoid or its derivatives undergoes the same treatment as is described in my aforesaid patent in connection with casein; that is to say that they may be united with the converting agent on or between suitably heated rolls. Any other method may be used whereby these substances are brought into intimate contact. Instead of using the converting agents in their natural state, they may be first dissolved in alcohol, water, or other suitable liquid which is afterward driven off by heat.

One of the practicable proportions which I have used is the following: Take a quantity of isinglass or gelatin, which would weigh four pounds if dried and sprinkle the same with one pound of beta-naphthol dissolved in alcohol. This is then well mixed, preferably on suitably heated rolls, and, when the mixture is completed, the mass is removed and is soft while hot but hardens on cooling. If instead of gelatin, a compound thereof with tannin be employed as above described, a satisfactory result is obtained, and it is to be understood that such a compound, as well as many others, are equivalents of gelatin in this connection.

I have found that, in order to produce the best results, the converting agent or agents employed should be "non-hygroscopic," by which I mean that they should not have the property of extracting moisture from the atmosphere. For this reason I have made specific claims for the use of non-hygroscopic converting agents. All of the agents which I have named above belong to this class.

Certain converting agents are better adapted to be used with some gelatoid derivatives and compounds than with others, and in many cases the derivatives of gelatoids or their compounds, or combinations of two or more derivatives or compounds may give results superior to those obtained from use of a single gelatoid.

Scraps of substances of various nature may be mixed in with the masses formed by my process, in considerable quantities. Among these are celluloid scraps, finely divided albuminoids, bits of horn, rubber, resins, gums and coloring matter. Compounding substances or fillers can also be incorporated without departing from this invention.

What I claim is—

1. The process of making a thermoplastic composition of matter which consists in intimately mixing a gelatoid with a converting agent, substantially as described.

2. The process of making a thermoplastic composition of matter which consists in intimately mixing a gelatoid and a converting agent and then heating and pressing the combined ingredients, substantially as described.

3. The process of making a thermoplastic composition of matter which consists in intimately mixing betanaphthol with a gelatoid and subjecting the combined ingredients to simultaneous heat and pressure substantially as described.

4. The process of making a thermoplastic composition of matter which consists in intimately mixing a gelatoid with beta-naphthol, substantially as described.

5. The process of making a composition of matter which consists in uniting a gelatoid with an agent or agents which render the same thermoplastic, substantially as described.

6. The process of making a composition of matter which consists in intimately mixing a gelatoid with an agent which renders the same thermoplastic, substantially as described.

7. The process of making a thermoplastic composition of matter which consists in uniting a gelatoid with a normally solid converting agent and subjecting the mass to heat and pressure, substantially as described.

8. The process of making a thermoplastic composition of matter which consists in uniting gelatin with a normally solid converting agent and subjecting the mass to heat and pressure, substantially as described.

9. The process of making a thermoplastic composition of matter which consists in intimately mixing gelatin with a non-hygroscopic converting agent, substantially as described.

10. The process of making a thermoplastic composition of matter which consists in uniting gelatin with a normally solid non-hygroscopic converting agent with heat and pressure, substantially as described.

11. The process of making a thermoplastic composition of matter which consists in uniting gelatin with a normally solid non-hygroscopic converting agent and then subjecting the mass to heat and pressure, substantially as described.

12. The process of making a relatively pliable thermoplastic composition of matter which consists in uniting a gelatoid with a normally solid converting agent and a normally liquid converting agent, and subjecting the mass to heat and pressure, substantially as described.

13. The process of making a relatively pliable thermoplastic composition of matter which consists in uniting a gelatoid with a normally solid converting agent and a liquid not antagonistic to the mixture, substantially as described.

14. A composition of matter consisting of a thermoplastic gelatoid, substantially as described.

15. A composition of matter consisting of a gelatoid united with beta-naphthol or its equivalent, substantially as described.

16. A composition of matter consisting of gelatin and a converting agent, substantially as described.

17. A composition of matter consisting of a gelatoid and a converting agent, substantially as described.

18. A composition of matter consisting of a gelatoid and beta-naphthol or its equivalent, substantially as described.

19. A composition of matter consisting of a gelatoid and a normally solid converting agent, substantially as described.

20. A composition of matter consisting of a gelatoid, a normally solid converting agent and a normally liquid converting agent, substantially as described.

21. A composition of matter consisting of a gelatoid or its equivalent and a non-hygroscopic converting agent, substantially as described.

BYRON B. GOLDSMITH.

Witnesses:
H. S. MacKaye,
M. S. Butler.